US012169052B2

(12) United States Patent  
Totsuka

(10) Patent No.: US 12,169,052 B2
(45) Date of Patent: Dec. 17, 2024

(54) SENSOR SYSTEM, CONTROL DEVICE, NON-TRANSITORY COMPUTER-READABLE MEDIUM, AND COMPUTER PROGRAM

(71) Applicant: KOITO MANUFACTURING CO., LTD., Tokyo (JP)

(72) Inventor: Yusuke Totsuka, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 223 days.

(21) Appl. No.: 17/802,881

(22) PCT Filed: Feb. 22, 2021

(86) PCT No.: PCT/JP2021/006628
§ 371 (c)(1),
(2) Date: Aug. 26, 2022

(87) PCT Pub. No.: WO2021/172270
PCT Pub. Date: Sep. 2, 2021

(65) Prior Publication Data
US 2023/0094075 A1    Mar. 30, 2023

(30) Foreign Application Priority Data
Feb. 27, 2020   (JP) .................. 2020-031850

(51) Int. Cl.
*F21S 45/00*    (2018.01)
*F21W 102/00*   (2018.01)
(52) U.S. Cl.
CPC .......... *F21S 45/00* (2018.01); *F21W 2102/00* (2018.01)
(58) Field of Classification Search
None
See application file for complete search history.

(56) References Cited

U.S. PATENT DOCUMENTS 5,920,382 A * 7/1999 Shimizu ............... G01C 3/085
                                                   396/128
2014/0232869 A1   8/2014 May et al.
(Continued)

FOREIGN PATENT DOCUMENTS

JP    H10319121 A    12/1998
JP    2001318146 A   11/2001
(Continued)

OTHER PUBLICATIONS

European Extended Search Report issued in European Application No. 21761778.6 mailed on Jul. 18, 2023 (7 pages).
(Continued)

*Primary Examiner* — Daniel L Greene
(74) *Attorney, Agent, or Firm* — Osha Bergman Watanabe & Burton LLP

(57) ABSTRACT

A sensor system includes a first sensor, a second sensor, a cover, and a control device. The first sensor detects, with first light, a state of a first area located outside a vehicle and outputs first detecting information corresponding to the state. The second sensor detects, with second light, a state of a second area located outside the vehicle and at least partially overlapping with the first area, and outputs second detecting information corresponding to the state. The cover covers at least one of the first and second sensors while forming a part of an outer face of the vehicle and allows passage of at least one of the first and second light. The control device detects an abnormality of the cover based on an inconsistency between the first and second detecting information that are outputted for an area where the first area and the second area overlap.

7 Claims, 5 Drawing Sheets

(56) References Cited

U.S. PATENT DOCUMENTS

| | | | |
|---|---|---|---|
| 2015/0217765 A1 | 8/2015 | Tokoro | |
| 2016/0280229 A1* | 9/2016 | Kasahara | G06V 10/141 |
| 2016/0288799 A1* | 10/2016 | Nguyen Van | G01S 13/931 |
| 2019/0003895 A1* | 1/2019 | Krishnan | B60R 11/04 |
| 2019/0049958 A1 | 2/2019 | Liu et al. | |
| 2019/0077377 A1 | 3/2019 | Schmidt | |
| 2020/0064475 A1 | 2/2020 | Hibino | |
| 2020/0174100 A1* | 6/2020 | Hori | B60Q 1/0023 |
| 2020/0236338 A1* | 7/2020 | Mitani | G06T 7/00 |
| 2023/0347850 A1* | 11/2023 | Davies | B60S 1/58 |

FOREIGN PATENT DOCUMENTS

| | | | |
|---|---|---|---|
| JP | 2015148899 A | 8/2015 | |
| JP | 2017106199 A | 6/2017 | |
| JP | 2020030121 A | 2/2020 | |
| JP | 2021004800 A | 1/2021 | |

OTHER PUBLICATIONS

International Search Report issued in corresponding International Application No. PCT/JP2021/006628; mailed Apr. 20, 2021 (7 pages).

Written Opinion of the International Searching Authority issued in corresponding International Application No. PCT/JP2021/006628; dated Apr. 20, 2021 (5 pages).

\* cited by examiner

SENSOR SYSTEM, CONTROL DEVICE, NON-TRANSITORY COMPUTER-READABLE MEDIUM, AND COMPUTER PROGRAM

CROSS-REFERENCE TO RELATED APPLICATIONS

The present application is a national stage application of International Patent Application No. PCT/JP2021/006628 filed Feb. 22, 2021, which claims priority to Japanese Patent Application No. JP2020031850 filed Feb. 27, 2020. The contents of both applications are incorporated herein in their entirety.

FIELD

The presently disclosed subject matter relates to a sensor system adapted to be installed in a monitoring device. The presently disclosed subject matter also relates to a control device that may constitute a part of the sensor system, a non-transitory computer-readable medium having stored a computer program adapted to be executed by a processor of the control device, and the computer program.

BACKGROUND

Patent Document 1 discloses a radar as an example of a sensor for detecting external information of a vehicle that is an example of the monitoring device. The radar is disposed in a lamp chamber of a lamp device for lighting the outside of the vehicle. In other words, the radar is covered by a cover that defines the lamp chamber and allows the passage of illumination light. The cover forms a part of an outer face of the vehicle, and allows the passage of detection light that is used by the radar to detect the external information.

CITATION LIST

Patent Document

Patent Document 1: Japanese Patent Publication No. 2017-106199 A

SUMMARY

Technical Problem

It is demanded to suppress degradation in the information detecting capability of a sensor covered by a cover forming a part of an outer face of a monitoring device.

Solution to Problem

In order to meet the demand described above, an illustrative aspect of the presently disclosed subject matter provides a sensor system adapted to be installed in a monitoring device, comprising:
 a first sensor configured to detect, with first light, a state of a first area that is located outside the monitoring device, and to output first detecting information corresponding to the state of the first area;
 a second sensor configured to detect, with second light, a state of a second area that is located outside the monitoring device and at least partially overlaps with the first area, and to output second detecting information corresponding to the state of the second area;
 a cover covering at least one of the first sensor and the second sensor while forming a part of an outer face of the monitoring device, and configured to allow passage of at least one of the first light and the second light; and
 a control device configured to detect an abnormality of the cover based on an inconsistency between the first detecting information and the second detecting information that are outputted for an area where the first area and the second area are overlapping with each other.

In order to meet the demand described above, an illustrative aspect of the presently disclosed subject matter provides a control device adapted to be installed in a monitoring device, comprising:
 a reception interface configured to:
  receive first detecting information corresponding to a state of a first area that is located outside the monitoring device from a first sensor that is configured to detect the state of the first area with first light; and
  receive second detecting information corresponding to a state of a second area that is located outside the monitoring device and at least partially overlaps with the first area from a second sensor that is configured to detect the state of the second area with second light; and
 a processor configured to detect an abnormality of a cover that covers at least one of the first sensor and the second sensor while forming a part of an outer face of the monitoring device and allows passage of at least one of the first light and the second light, based on an inconsistency between the first detecting information and the second detecting information that ate outputted for an area where the first area and the second area are overlapping with each other.

In order to meet the demand described above, an illustrative aspect of the presently disclosed subject matter provides a non-transitory computer-readable medium having stored a computer program adapted to be executed by a processor installed in a control device adapted to be installed in a monitoring device, the computer program being configured to cause, when executed, the control device to:
 receive first detecting information corresponding to a state of a first area that is located outside the monitoring device from a first sensor that is configured to detect the state of the first area with first light;
 receive second detecting information corresponding to a state of a second area that is located outside the monitoring device and at least partially overlaps with the first area from a second sensor that is configured to detect the state of the second area with second light; and
 detect an abnormality of a cover that covers at least one of the first sensor and the second sensor while forming a part of an outer face of the monitoring device and allows passage of at least one of the first light and the second light, based on an inconsistency between the first detecting information and the second detecting information that ate outputted for an area where the first area and the second area are overlapping with each other.

In order to meet the demand described above, an illustrative aspect of the presently disclosed subject matter provides a computer program adapted to be executed by a processor installed in a control device adapted to be installed in a monitoring device, the computer program being configured to cause, when executed, the control device to:
 receive first detecting information corresponding to a state of a first area that is located outside the monitoring device from a first sensor that is configured to detect the state of the first area with first light;

receive second detecting information corresponding to a state of a second area that is located outside the monitoring device and at least partially overlaps with the first area from a second sensor that is configured to detect the state of the second area with second light; and detect an abnormality of a cover that covers at least one of the first sensor and the second sensor while forming a part of an outer face of the monitoring device and allows passage of at least one of the first light and the second light, based on an inconsistency between the first detecting information and the second detecting information that ate outputted for an area where the first area and the second area are overlapping with each other.

According to the configuration of each of the illustrative aspects described above, it is possible to detect an abnormality of the cover in the process of acquiring the first detecting information by the first sensor and acquiring the second detecting information by the second sensor by utilizing a part of each information as acquired. As a result, it is possible to take a highly real-time response to the occurrence of an abnormality without requiring special structural changes or addition of elements to the first sensor or the second sensor. Accordingly, it is possible to suppress degradation in the information detecting capability by the sensor covered by the cover forming a part of the outer face of the monitoring device.

DESCRIPTION OF EMBODIMENTS

Examples of embodiments will be described below in detail with reference to the accompanying drawings. In each of the drawings used in the following descriptions, the scale is appropriately changed in order to make each of the members have a recognizable size.

In the accompanying drawings, an arrow F represents a forward direction of the illustrated structure. An arrow B represents a rearward direction of the illustrated structure. An arrow L represents a leftward direction of the illustrated structure. An arrow R represents a rightward direction of the illustrated structure. The terms "left" and "right" used in the following descriptions represent the leftward direction and the rightward direction as viewed from a driver's seat.

Figure 1:
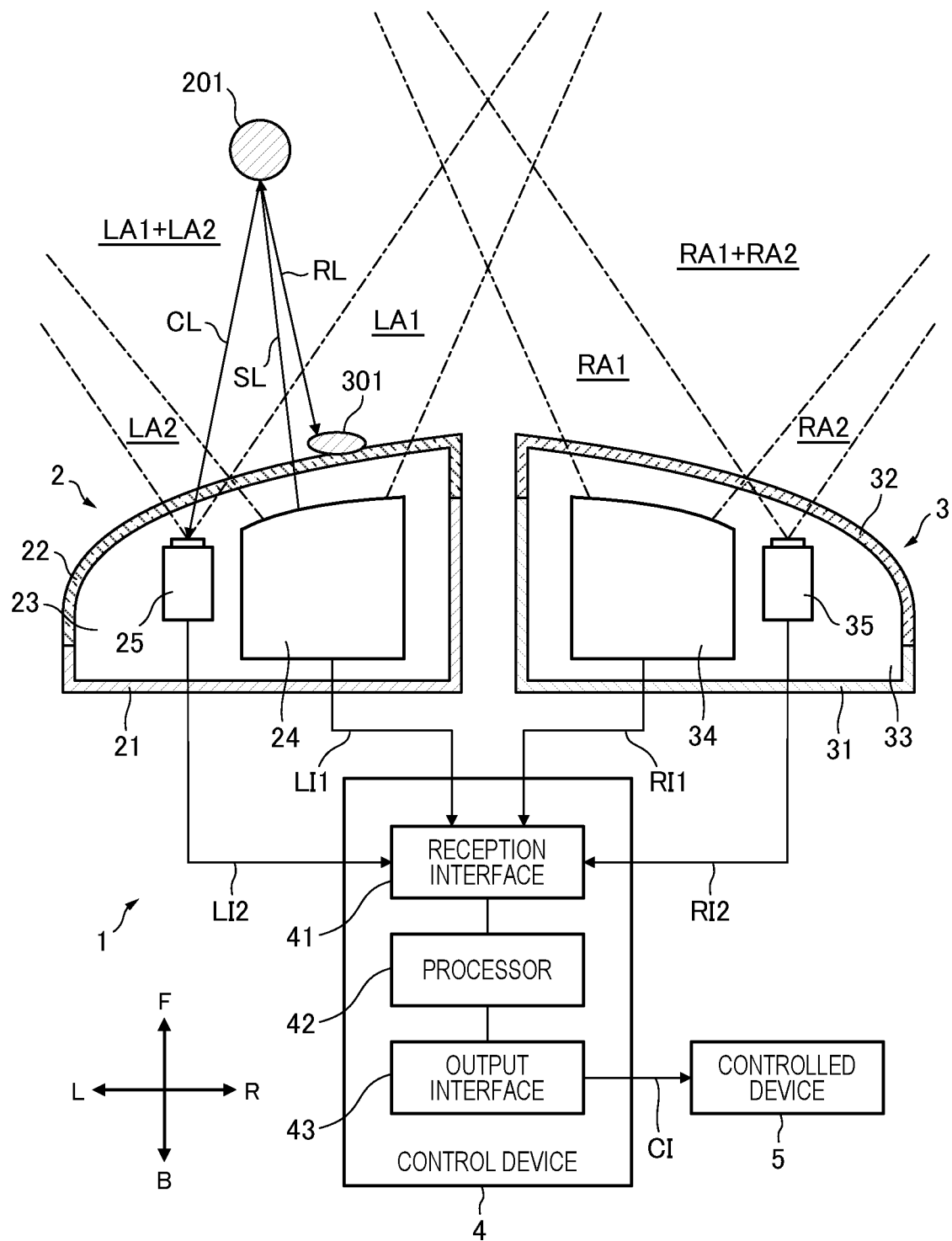
FIG. 1 illustrates a configuration of a sensor system according to an embodiment.
Figure 2:
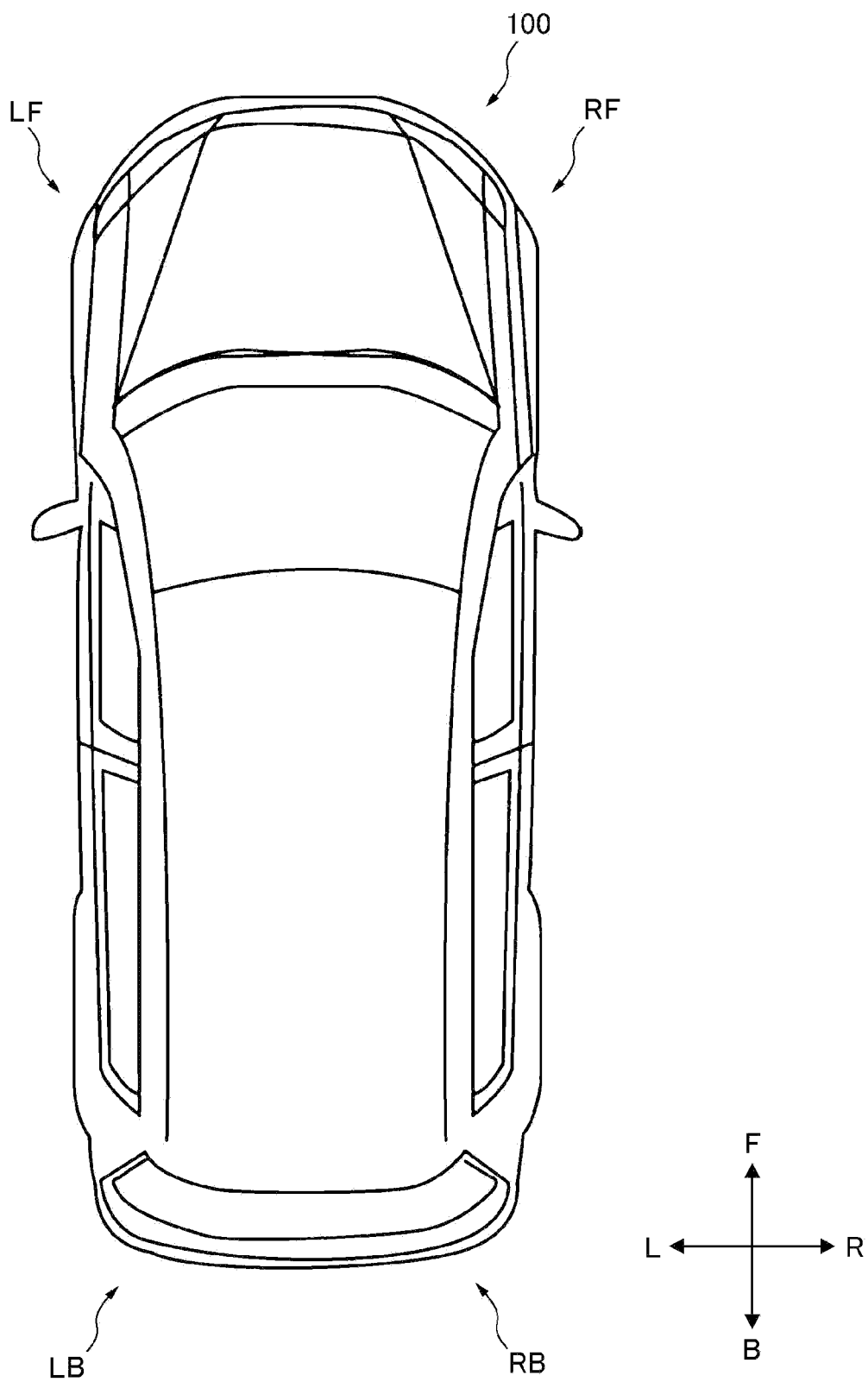
FIG. 2 illustrates an appearance of a vehicle in which the sensor system of FIG. 1 is to be installed.

FIG. 1 schematically illustrates a configuration of a sensor system 1 according to an embodiment. The sensor system 1 is installed in a vehicle 100 illustrated in FIG. 2. The shape of the vehicle body of the vehicle 100 is a mere example. The vehicle 100 is an example of a mobile entity. The vehicle 100 is also an example of a monitoring device.

The sensor system 1 includes a left sensor unit 2. In the present embodiment, the left sensor unit 2 is installed in a left front portion LF of the vehicle 100 illustrated in FIG. 2. The left front portion LF is a portion located on the left of the center in a left-right direction of the vehicle 100 and ahead of the center in a front-rear direction of the vehicle 100.

As illustrated in FIG. 1, the left sensor unit 2 includes a left housing 21 and a left translucent cover 22. The left translucent cover 22 forms a part of an outer face of the vehicle 100. The left translucent cover 22 and the left housing 21 define a left chamber 23.

The left sensor unit 2 includes a left LiDAR sensor 24. The left LiDAR sensor 24 is disposed in the left chamber 23. The left translucent cover 22 forms a part of the outer face of the vehicle 100 so as to cover the left LiDAR sensor 24 when viewed from the outside of the vehicle 100.

The left LiDAR sensor 24 has a configuration for emitting left sensing light SL toward a first left sensing area LA1 that is defined outside the vehicle 100, as well as a configuration for detecting left returned light RL that is generated by an object existing in the first left sensing area LA1 and reflecting the left sensing light SL. As the left sensing light SL, for example, infrared light having a wavelength of 905 nm can be used.

The left LiDAR sensor 24 can acquire information as for the distance to the object associated with the left returned light RL, for example, based on a time length from when the left sensing light SL is emitted toward a certain direction in the first left sensing area LA1 to when the left returned light RL is detected. In addition, by accumulating such distance information while associating with the sensed position, it is possible to acquire information as for the shape of the object associated with the left returned light RL. Additionally or alternatively, it is possible to acquire information as for an attribute such as the material of the object associated with the left returned light RL based on the difference in waveforms of the left sensing light SL and the left returned light RL.

In other words, the left LiDAR sensor 24 detects the state of the first left sensing area LA1 located outside the vehicle 100 using the left sensing light SL and the left returned light RL. The left LiDAR sensor 24 is an example of a first sensor. Each of the left sensing light SL and the left returned light RL is an example of first light. The first left sensing area LA1 is an example of a first area.

The left LiDAR sensor 24 is configured to output first left detecting information LI1 corresponding to the detected state of the first left sensing area LA1. The first left detecting information LI1 may be in the form of analog data or digital data.

The left sensor unit 2 includes a left camera 25. The left camera 25 is disposed in the left chamber 23. The left translucent cover 22 forms a part of the outer face of the vehicle 100 so as to cover the left camera 25 when viewed from the outside of the vehicle 100.

The left camera 25 has an angle of view corresponding to a second left sensing area LA2 that is defined outside the vehicle 100. The left camera 25 is configured to acquire an image of the second left sensing area LA2. The left camera 25 includes an image pickup device sensitive to wavelengths in the visible light range. Additionally or alternatively, the left camera 25 may include an image pickup device sensitive to wavelengths in the infrared range.

In other words, the left camera 25 detects the state of the second left sensing area LA2 located outside the vehicle 100 using light having a wavelength at which the image pickup element has sensitivity. The left camera 25 is an example of a second sensor. The light having a wavelength at which the image pickup element of the left camera 25 has sensitivity is an example of second light. The second left sensing area LA2 is an example of a second area.

The left camera 25 is configured to output second left detecting information LI2 corresponding to the image acquired by the second left sensing area LA2. The second left detecting information LI2 may be in the form of analog data or digital data.

The sensor system 1 includes a control device 4. The control device 4 may be disposed at an appropriate position in the vehicle 100. For example, the control device 4 may be disposed in the left chamber 23. Alternatively, the control device 4 may be mounted on an outer face of the left housing 21. Alternatively, the control device 4 may be implemented as a part of a function of a control device such as an ECU installed in the vehicle 100.

The control device 4 includes a reception interface 41 and a processor 42. The reception interface 41 is configured as an interface capable of receiving the first left detecting information LI1 outputted from the left LiDAR sensor 24 and the second left detecting information LI2 outputted from the left camera 25. In a case where at least one of the first left detecting information LI1 and the second left detecting information LI2 is in the form of analog data, the reception interface 41 may be equipped with an appropriate conversion circuit including an A/D converter. The processor 42 performs processing with respect to the first left detecting information LI1 and the second left detecting information LI2 that are in the form of digital data.

The first left sensing area LA1 and the second left sensing area LA2 are partially overlapping with each other. In FIG. 1, an area where the first left sensing area LA1 and the second left sensing area LA2 overlap with each other is denoted as "LA1+LA2". The processor 42 is configured to detect an abnormality of the left translucent cover 22 based on the inconsistency between the first left detecting information LI1 and the second left detecting information LI2 outputted from the area where the first left sensing area LA1 and the second left sensing area LA2 overlap.

As used herein, the term "an abnormality of a cover" comprehends a state that a foreign matter adheres to an outer face of the cover, a state that an outer face of the cover is damaged, and a state that the cover is discolored due to aging. Examples of the foreign matter include dirt, water droplets, snow chips, carcasses of insects, and the like.

The left translucent cover 22 allows passage of the left sensing light SL and the left returned light RL that are to be used by the left LiDAR sensor 24 to detect the state of the first left sensing area LA1. Similarly, the left translucent cover 22 allows passage of light to be used by the left camera 25 to acquire the image of the second left sensing area LA2. Accordingly, in a case where the left translucent cover 22 is in the abnormal state as described above, at least one of the left sensing light SL, the left returned light RL, and the light to be used by the left camera 25 for the image pickup would not pass through the left translucent cover 22 normally.

In FIG. 1, it is illustrated a state that an object 201 is located in an area where the first left sensing area LA1 and the second left sensing area LA2 overlap with each other. It is also illustrated a state that a foreign matter 301 adheres to the outer face of the left translucent cover 22. In this example, the left sensing light SL emitted from the left LiDAR sensor 24 is reflected by the object 201, so that the left returned light RL is generated. However, the left returned light RL is obstructed by the foreign matter 301 and is not subjected to detection by the left LiDAR sensor 24. On the other hand, the light CL coming from the object 201 is incident on the left camera 25.

In this case, the object 201 is captured in the image of the second left sensing area LA2 acquired by the left camera 25, but the information as for at least a portion of the object 201 is lost in the information of the first left sensing area LA1 acquired by the left LiDAR sensor 24. This difference causes inconsistency between the first left detecting information LI1 and the second left detecting information LI2 outputted for the area where the first left sensing area LA1 and the second left sensing area LA2 overlap. The processor 42 detects an abnormality of the left translucent cover 22 based on the inconsistency.

The control device 4 includes an output interface 43. In a case where an abnormality of the left translucent cover 22 is detected, the processor 42 outputs control information CI for controlling the operation of a controlled device 5 installed in the vehicle 100 from the output interface 43. Examples of the controlled device 5 include a cleaner for cleaning the outer face of the left translucent cover 22, a wiper for wiping the outer face of the left translucent cover 22, and a notification device for notifying an occupant of the vehicle 100 of the detected abnormality.

Alternatively, in a case where an abnormality of the left translucent cover 22 is detected, the processor 42 may invalidate at least a part of the driving support operation of the vehicle 100 that is to be performed based on at least one of the first left detecting information LI1 and the second left detecting information LI2.

As used herein, the term "driving support" means control processing that at least partially performs at least one of driving operation (steering operation, acceleration, deceleration, etc.), monitoring of a driving environment, and backup of driving operation. That is, the term "driving support" means not only the partial driving support such as braking function for collision avoidance and assisting function for lane-keeping, but also a full self-driving operation.

Figure 3:
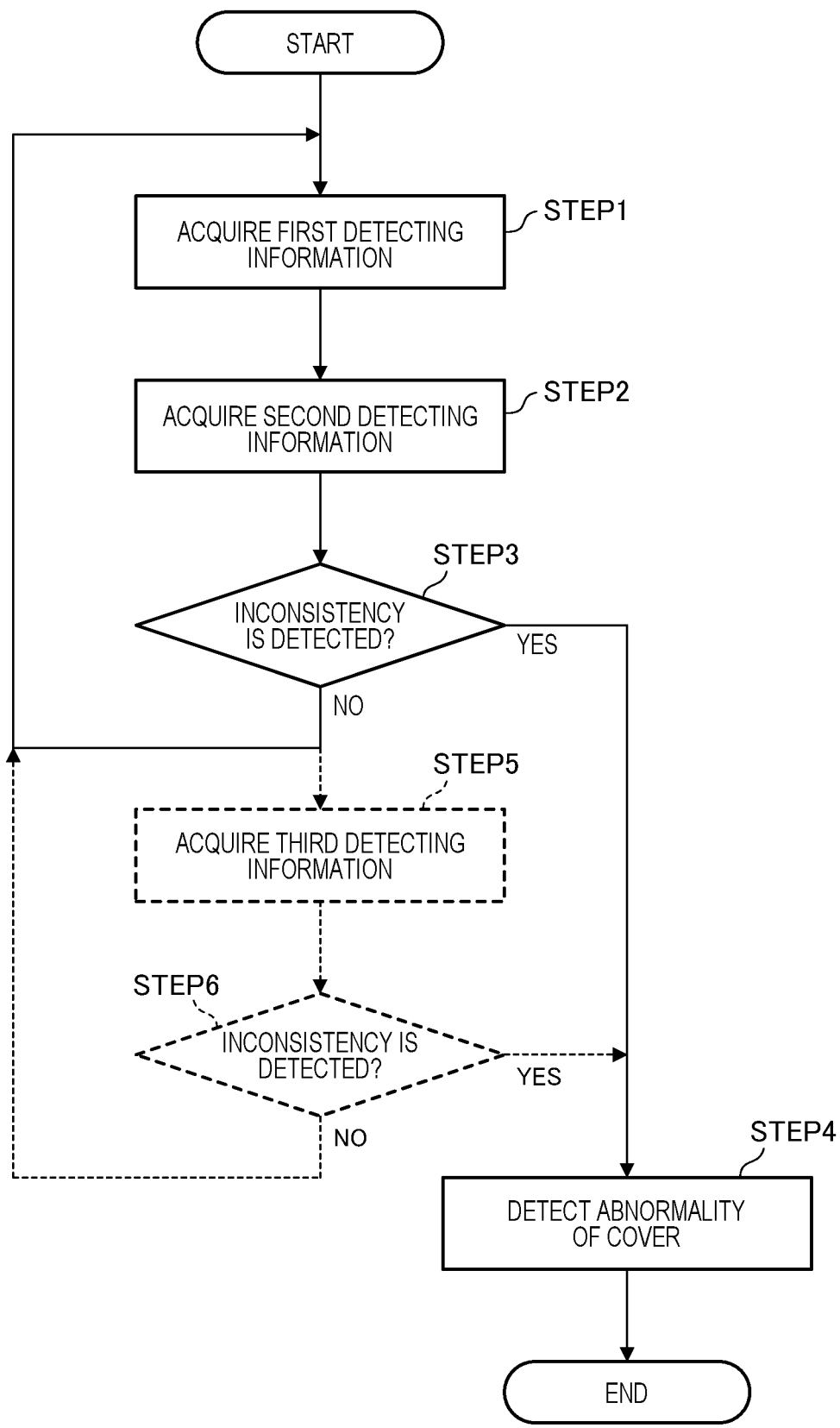
FIG. 3 is a diagram for explaining the operation performed by the sensor system of FIG. 1.

FIG. 3 illustrates a flow of processing executed by the processor 42 of the control device 4 configured as described above.

First, the processor 42 acquires the first left detecting information LI1 outputted from the left LiDAR sensor 24 through the reception interface 41 (STEP1).

Subsequently, the processor 42 acquires the second left detecting information LI2 outputted from the left camera 25 through the reception interface 41 (STEP2). It should be noted that STEP1 and STEP2 may be executed in the reverse order or may be executed in parallel.

Since the positional relationship between the left LiDAR sensor 24 and the left camera 25 is known, it is also known which portion of the first left sensing area LA1 overlaps the second left sensing area LA2 when viewed from the left LiDAR sensor 24. Accordingly, in the first left detecting information LI1 outputted from the left LiDAR sensor 24, it is possible to specify data based on the left returned light RL coming from the area overlapping the second left sensing area LA2. Similarly, it is also known which portion of the image of the second left sensing area LA2 acquired by the left camera 25 overlaps the first left sensing area LA1. Accordingly, in the second left detecting information LI2 outputted from the left camera 25, it is possible to specify data corresponding to a portion of the image in which an area overlapping the first left sensing area LA1 is captured.

Subsequently, the processor 42 determines whether there is an inconsistency between the first left detecting information LI1 and the second left detecting information LI2 for the area where the first left sensing area LA1 and the second left sensing area LA2 overlap (STEP3). For example, it is determined whether an object is detected in one of the first left sensing area LA1 and the second left sensing area LA2, but the object is not detected in the other of the first left sensing area LA1 and the second left sensing area LA2.

If it is determined that there is no inconsistency between the first left detecting information LI1 and the second left detecting information LI2 outputted for the area where the first left sensing area LA1 and the second left sensing area LA2 overlap (NO in STEP3), the processing returns to STEP1.

In a case where it is determined that there is an inconsistency between the first left detecting information LI1 and the second left detecting information LI2 outputted for the area where the first left sensing area LA1 and the second left sensing area LA2 overlap with each other (YES in STEP3), the processor 42 determines that there is an abnormality in the left translucent cover 22 (STEP4). The processor 42 outputs control information CI for controlling the operation of the controlled device 5 to cope with the abnormality from the output interface 43, and terminates the processing. Alternatively, the processor 42 invalidates at least a part of the driving support operation of the vehicle 100 that is to be performed based on at least one of the first left detecting information LI1 and the second left detecting information LI2.

According to such a configuration, it is possible to detect an abnormality of the left translucent cover 22 in the process of acquiring the first left detecting information LI1 by the left LiDAR sensor 24 and acquiring the second left detecting information LI2 by the left camera 25 by utilizing a part of each information as acquired. As a result, it is possible to take a highly real-time response to the occurrence of an abnormality without requiring special structural changes or addition of elements to the left LiDAR sensor 24 or the left camera 25. Accordingly, it is possible to suppress degradation in the information detecting capability of the left LiDAR sensor 24 and the left camera 25 covered by the left translucent cover 22 forming a part of the outer face of the vehicle 100.

As illustrated in FIG. 1, the sensor system 1 includes a right sensor unit 3. The right sensor unit 3 is installed in a right front portion RF of the vehicle 100. The right front portion RF is a portion located on the right of the center in the left-right direction of the vehicle 100 and ahead of the center in the front-rear direction of the vehicle 100.

The right sensor unit 3 includes a right housing 31 and a right translucent cover 32. The right translucent cover 32 forms a part of the outer face of the vehicle 100. The right translucent cover 32 and the right housing 31 define a right chamber 33.

The right sensor unit 3 includes a right LiDAR sensor 34. The right LiDAR sensor 34 is disposed in the right chamber 33. The right translucent cover 32 forms a part of the outer face of the vehicle 100 so as to cover the right LiDAR sensor 34 when viewed from the outside of the vehicle 100. Since the configuration of the right LiDAR sensor 34 is the same as that of the left LiDAR sensor 24, repetitive descriptions thereof will be omitted.

In other words, the right LiDAR sensor 34 detects the state of a first right sensing area RA1 defined outside the vehicle 100 using right sensing light and right returned light. The right LiDAR sensor 34 is configured to output first right detecting information RI1 corresponding to the detected state of the first right sensing area RA1. The first right detecting information RI1 may be in the form of analog data or digital data.

The right sensor unit 3 includes a right camera 35. The right camera 35 is disposed in the right chamber 33. The right translucent cover 32 forms a part of the outer face of the vehicle 100 so as to cover the right camera 35 when viewed from the outside of the vehicle 100.

The right camera 35 has an angle of view corresponding to a second right sensing area RA2 outside the vehicle 100. The right camera 35 is configured to acquire an image of the second right sensing area RA2. Since the configuration of the right camera 35 is the same as that of the left camera 25, repetitive descriptions thereof will be omitted.

In other words, the right camera 35 detects the state of the second right sensing area RA2 defined outside the vehicle 100 using light having a wavelength at which the image pickup element of the right camera 35 has sensitivity. The right camera 35 is configured to output second right detecting information RI2 corresponding to the acquired image of the second right sensing area RA2. The second right detecting information RI2 may be in the form of analog data or digital data.

The reception interface 41 of the control device 4 can receive the first right detecting information RI1 outputted from the right LiDAR sensor 34 and the second right detecting information RI2 outputted from the right camera 35.

The first right sensing area RA1 and the second right sensing area RA2 are partially overlapping with each other. In FIG. 1, an area where the first right sensing area RA1 and the second right sensing area RA2 overlap with each other is denoted as "RA1+RA2". In this case, the processor 42 of the control device 4 can detect an abnormality of the right translucent cover 32 based on the inconsistency between the first right detecting information RI1 and the second right detecting information RI2 outputted for the area where the first right sensing area RA1 and the second right sensing area RA2 overlap.

In other words, the right LiDAR sensor 34 may be an example of the first sensor. Each of the right sensing light and the right returned light may be an example of the first light. The first right sensing area RA1 may be an example of the first area. The right camera 35 may be an example of the second sensor. The light having a wavelength at which the image pickup element of the right camera 35 has sensitivity can be an example of the second light. The second right sensing area RA2 may be an example of the second area. Since the processing for detecting the abnormality of the right translucent cover 32 performed by the processor 42 is the same as the processing for detecting the abnormality of the left translucent cover 22, repetitive descriptions thereof will be omitted.

In the above example, both the left LiDAR sensor 24 and the left camera 25 are disposed in the left chamber 23, and are covered by the left translucent cover 22 when viewed from the outside of the vehicle 100. In other words, the abnormality of the left translucent cover 22 is detected using the information acquired by the left LiDAR sensor 24 and the left camera 25 disposed in the left chamber 23 defined by the left translucent cover 22. Similarly, both the right LiDAR sensor 34 and the right camera 35 are disposed in the right chamber 33, and are covered by the right translucent cover 32 when viewed from the outside of the vehicle 100. In other words, the abnormality of the right translucent cover 32 is detected using the information acquired by the right LiDAR sensor 34 and the right camera 35 disposed in the right chamber 33 defined by the right translucent cover 32.

Since two sensors for detecting information that is to be used to detect the abnormality are disposed in a chamber defined by a translucent cover subjected to the abnormality detection, not only the positional relationship between the two sensors can be accurately determined, but also the positional relationship between the two sensors is unlikely to change. Accordingly, the position of the area where the sensing areas of the two sensors overlap with each other is also unlikely to change. As a result, it is possible to suppress degradation in the accuracy of the abnormality detection of the translucent cover that is to be performed based on the information acquired from the area where the sensing areas of both sensors overlap with each other.

Figure 4:
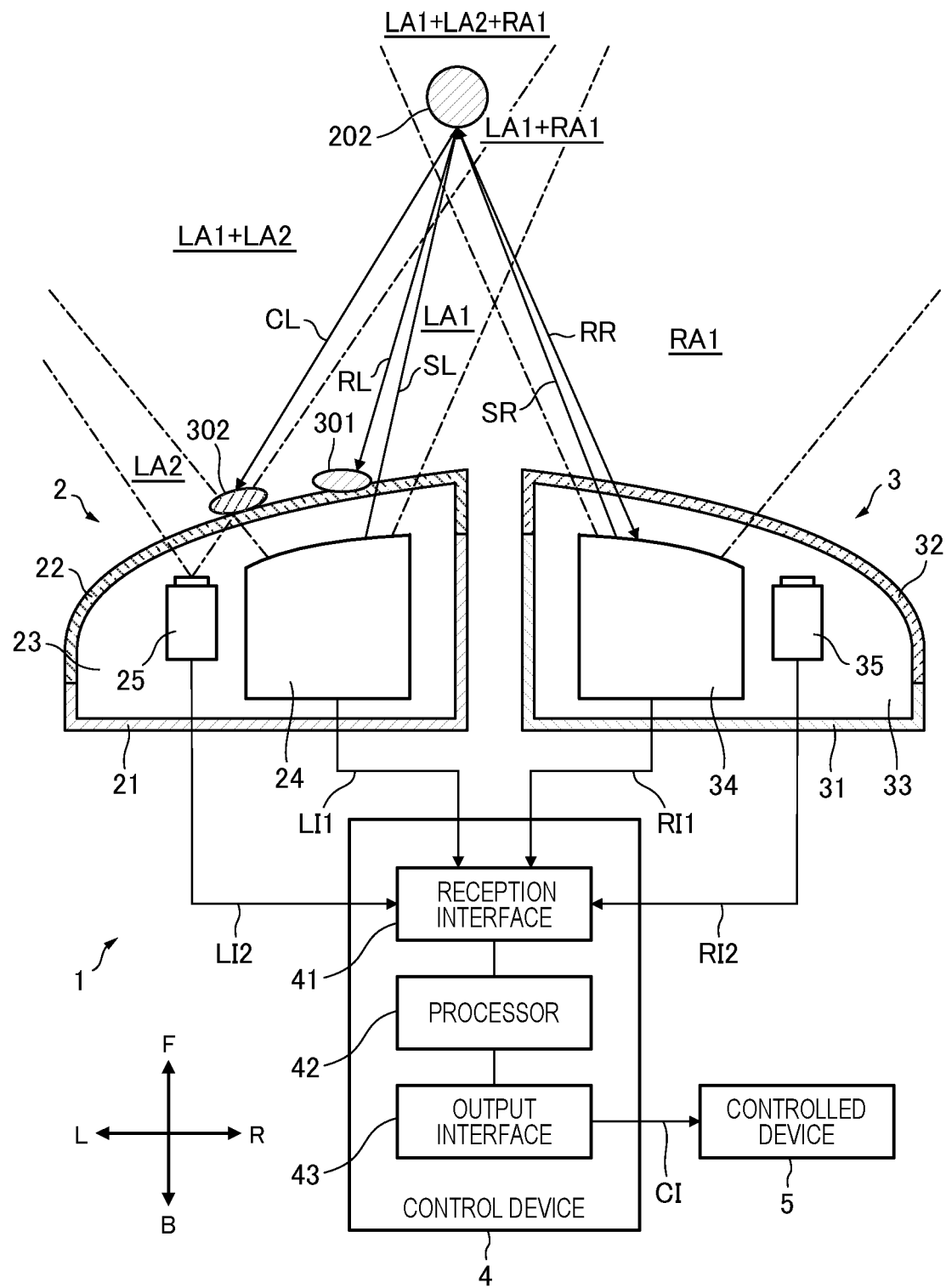
FIG. 4 is a diagram for explaining the operation performed by the sensor system of FIG. 1.

As illustrated in FIG. 1, the first left sensing area LA1 and the first right sensing area RA1 are partially overlapping with each other. In FIG. 4, an area where the first left sensing area LA1 and the first right sensing area RA1 overlap with each other is denoted as "LA1+RA1". The processor 42 of the control device 4 may be configured to detect an abnormality of the left translucent cover 22 or the right translucent cover 32 based on the inconsistency between the first left detecting information LI1 and the first right detecting information RI1 outputted for the area where the first left sensing area LA1 and the first right sensing area RA1 overlap.

In other words, the right LiDAR sensor 34 may be an example of the second sensor. The right sensing light and the right returned light may be an example of the second light. The first right sensing area RA1 may be an example of the second area.

In FIG. 4, it is illustrated a state that the object 202 is located in an area where the first left sensing area LA1 and the first right sensing area RA1 overlap with each other. In this example, the left sensing light SL emitted from the left LiDAR sensor 24 is reflected by the object 202 to generate the left returned light RL. However, the left returned light RL is obstructed by the foreign matter 301 adhering to the left translucent cover 22 and is not subjected to detection by the left LiDAR sensor 24. On the other hand, the right sensing light SR emitted from the right LiDAR sensor 34 is reflected by the object 202 to generate the right returned light RR. The right returned light RR is subjected to sensing by the right LiDAR sensor 34.

In this case, the object 202 can be detected based on the information of the first right sensing area RA1 acquired by the right LiDAR sensor 34, but information as for at least a portion of the object 202 is lost in the information of the first left sensing area LA1 acquired by the left LiDAR sensor 24. This difference causes inconsistency between the first left detecting information LI1 and the first right detecting information RI1 outputted for the area where the first left sensing area LA1 and the first right sensing area RA1 overlap. The processor 42 detects an abnormality of the left translucent cover 22 or the right translucent cover 32 based on the inconsistency.

In a case where the abnormality of the translucent cover is detected based on the information acquired by two sensors disposed in the chamber defined by the same translucent cover, there is a possibility that both the information acquired by the two sensors are lost due to the abnormality occurred in the translucent cover. For example, the information of the object 202 illustrated in FIG. 4 is lost from both the first left detecting information LI1 and the second left detecting information LI2 because the light coming from the object 202 is obstructed by the foreign matter 301 and the foreign matter 302 attached to the left translucent cover 22.

Since one of two sensors used for detecting an abnormality of a translucent cover is arranged outside a chamber defined by the translucent cover, it is possible to reduce the influence of the abnormality on the information acquired by the other one of the two sensors. Accordingly, it is possible to suppress degradation in the detection accuracy of the abnormality of the translucent cover.

The above processing may be performed based on the inconsistency between the second left detecting information LI2 and the second right detecting information RI2 obtained for the area where the second left sensing area LA2 and the second right sensing area RA2 overlap.

As illustrated in FIG. 4, the first left sensing area LA1, the second left sensing area LA2, and the first right sensing area RA1 are partially overlapping with each other. In FIG. 4, an area where the first left sensing area LA1, the second left sensing area LA2, and the first right sensing area RA1 overlap is denoted as "LA1+LA2+RA1". In this case, the processor 42 of the control device 4 may be configured to detect an abnormality of the left translucent cover 22 or the right translucent cover 32 based on the inconsistency among the first left detecting information LI1, the second left detecting information LI2, and the first right detecting information RI1 outputted for the area where the first left sensing area LA1, the second left sensing area LA2, and the first right sensing area RA1 overlap.

In this case, the right LiDAR sensor 34 may be an example of a third sensor. Each of the right sensing light SR and the right returned light RR may be an example of third light. The first right sensing area RA1 may be an example of a third area.

Relying solely on the inconsistency between the first left detecting information LI1 and the first right detecting information RI1 outputted for the area where the first left sensing area LA1 and the first right sensing area RA1 overlap, it is possible to detect that there is an abnormality in either the left translucent cover 22 or the right translucent cover 32, but it would be impossible to specify which translucent cover is abnormal. By additionally considering the inconsistency with the second left detecting information LI2, it is possible to specify which translucent cover has an abnormality.

Specifically, as illustrated in FIG. 3, in a case where it is determined that there is no inconsistency between the first left detecting information LI1 and the second left detecting information LI2 outputted for the area where the first left sensing area LA1 and the second left sensing area LA2 overlap with each other (NO in STEP3), the processor 42 acquires the first right detecting information RI1 outputted from the right LiDAR sensor 34 through the reception interface 41 (STEP5). This determination can be made in a case where each of the first left detecting information LI1 and the second left detecting information LI2 has no missing information item, or in a case where each of the first left detecting information LI1 and the second left detecting information LI2 has missing information item.

Subsequently, the processor 42 determines whether there is an inconsistency between the first right detecting information RI1 and each of the first left detecting information LI1 and the second left detecting information LI2 (STEP6).

In a case where it is determined that there is no inconsistency between the first right detecting information RI1 and each of the first left detecting information LI1 and the second left detecting information LI2 (NO in STEP6), it can be specified that the determination of STEP3 is a result based on the fact that each of the first left detecting information LI1 and the second left detecting information LI2 has no missing information item. In other words, it is specified that there is no abnormality in both the left translucent cover 22 and the right translucent cover 32. The processor 42 returns the processing to STEP1.

In a case where it is determined that there is an inconsistency between the first right detecting information RI1 and each of the first left detecting information LI1 and the second left detecting information LI2 (YES in STEP6), it can be specified that the determination of STEP3 is a result based on the fact that each of the first left detecting information LI1 and the second left detecting information LI2 has missing information item. The fact that the first right detecting information RI1 does not coincide with this result means that there is an abnormality in the left translucent cover 22 and there is no abnormality in the right translucent cover 32.

This processing may be performed based on an area where the first left sensing area LA1 and the second left sensing area LA2 overlap the second right sensing area RA2 instead of the first right sensing area RA1.

The processor 42 may also detect an abnormality of the left translucent cover 22 or the right translucent cover 32 based on the inconsistency among the first right detecting information RI1, the second right detecting information RI2, and the first left detecting information LI1 obtained for the area where the first right sensing area RA1, the second right sensing area RA2, and the first left sensing area LA1 overlap. This processing may be performed based on an area where the first right sensing area RA1 and the second right sensing area RA2 overlap the second left sensing area LA2 instead of the first left sensing area LA1.

The control device 4 may be configured to make the determination as to the above-mentioned inconsistency in a case where the relative speed between a specific translucent cover and a detected object located in an area where sensing areas of at least two sensors used to detect an abnormality of the translucent cover overlap is no greater than a threshold value.

For example, such a determination may be made in a case where a traveling speed of the vehicle 100 detected by a speed sensor or the like is no greater than a threshold value. In this case, examples of the detected object may include a vehicle stopping ahead of the vehicle 100, a traffic structure, and a traffic sign. Examples of the traffic structure may include guardrails, signals, sidewalk bridges, and the like. Examples of the traffic sign may include a sign board, a lane, a stop line, a crosswalk, and a sign character that are provided on a road surface.

According to such a configuration, since the processing can be executed under a condition that the relative movement between the detected object and the translucent cover is small, it is possible to accurately detect the abnormality of the translucent cover while suppressing an increase in the processing load. In particular, since the traffic sign itself is stationary and the translucent cover can easily approach, the traffic sign is suitable as the detected object.

Even if the vehicle 100 is traveling at a speed higher than the threshold value, the determination as to the above-mentioned inconsistency can be performed if the relative speed difference with respect to a vehicle traveling ahead of the vehicle 100 is small.

The processor 42 having the functions described above can be implemented by a general-purpose microprocessor operating in cooperation with a general-purpose memory. Examples of the general-purpose microprocessor include a CPU, an MPU, and a GPU. Examples of the general-purpose memory include a RAM and a ROM. In this case, a computer program for executing the processing described above can be stored in the ROM. The ROM is an example of a non-transitory computer-readable medium having stored a computer program. The general-purpose microprocessor specifies at least a part of the computer program stored in the ROM, loads the program on the RAM, and executes the processing described above in cooperation with the RAM.

The processor 42 having the functions described above may be implemented by an exclusive integrated circuit capable of executing the computer program described above, such as a microcontroller, an ASIC, and an FPGA. In this case, the above-described computer program is pre-installed in a memory element included in the exclusive integrated circuit. The memory element is an example of a non-transitory computer-readable medium having stored a computer program. The processor 42 may also be implemented by a combination of a general-purpose microprocessor and an exclusive integrated circuit.

The above embodiments are merely illustrative for facilitating understanding of the presently disclosed subject matter. The configuration according to each of the above embodiments can be appropriately modified or improved without departing from the gist of the presently disclosed subject matter.

In the above embodiment, the control device 4 is shared by the left sensor unit 2 and the right sensor unit 3. However, the control device 4 having the above configuration may be provided for each of the left sensor unit 2 and the right sensor unit 3.

In the above embodiment, each of the left sensor unit 2 and the right sensor unit 3 includes a LiDAR sensor and a camera as two sensors used to detect an abnormality in the translucent cover. However, both of the two sensors used for detecting the abnormality of the translucent cover may be LiDAR sensors or both may be cameras.

As used herein, the term "left sensor unit" means a sensor unit located on the left of the right sensor unit when viewed from the cabin of the vehicle 100. As used herein, the term "right sensor unit" means a sensor unit located on the right of the left sensor unit when viewed from the cabin of the vehicle 100.

Accordingly, the left sensor unit 2 need not be installed in the left portion of the vehicle 100, and the right sensor unit 3 need not be installed in the right portion of the vehicle 100. For example, the left sensor unit 2 may be installed in a right rear portion RB of the vehicle 100 illustrated in FIG. 2. In this case, the right sensor unit 3 may be installed in a left rear portion LB of the vehicle 100 illustrated in FIG. 2. The right rear portion RB is a portion located on the right of the center in the left-right direction of the vehicle 100 and behind the center in the front-rear direction of the vehicle 100. The left rear portion LB is a portion located on the left of the center in the left-right direction of the vehicle 100 and behind the center in the front-rear direction of the vehicle 100. In this example, an area from which information for detecting an abnormality of the translucent cover is acquired is located behind the vehicle 100.

Alternatively, the left sensor unit 2 may be installed in the left rear portion LB of the vehicle 100. In this case, the right sensor unit 3 may be installed in the left front portion LF of the vehicle 100. In this example, the area where the information for detecting the abnormality of the translucent cover is acquired is located on the left of the vehicle 100.

Alternatively, the left sensor unit 2 may be installed in the right front portion RF of the vehicle 100. In this case, the right sensor unit 3 may be installed in the right rear portion RB of the vehicle 100. In this example, the area where the information for detecting the abnormality of the translucent cover is acquired is located on the right of the vehicle 100.

A lamp for supplying illumination light to the outside of the vehicle 100 may be disposed in at least one of the left chamber 23 of the left sensor unit 2 and the right chamber 33 of the right sensor unit 3.

The mobile entity in which the sensor system 1 is installed is not limited to the vehicle 100. Examples of other mobile entities include railways, flying objects, aircrafts, and ships. The mobile entity in which the sensor system 1 is installed may not require a driver.

Figure 5:
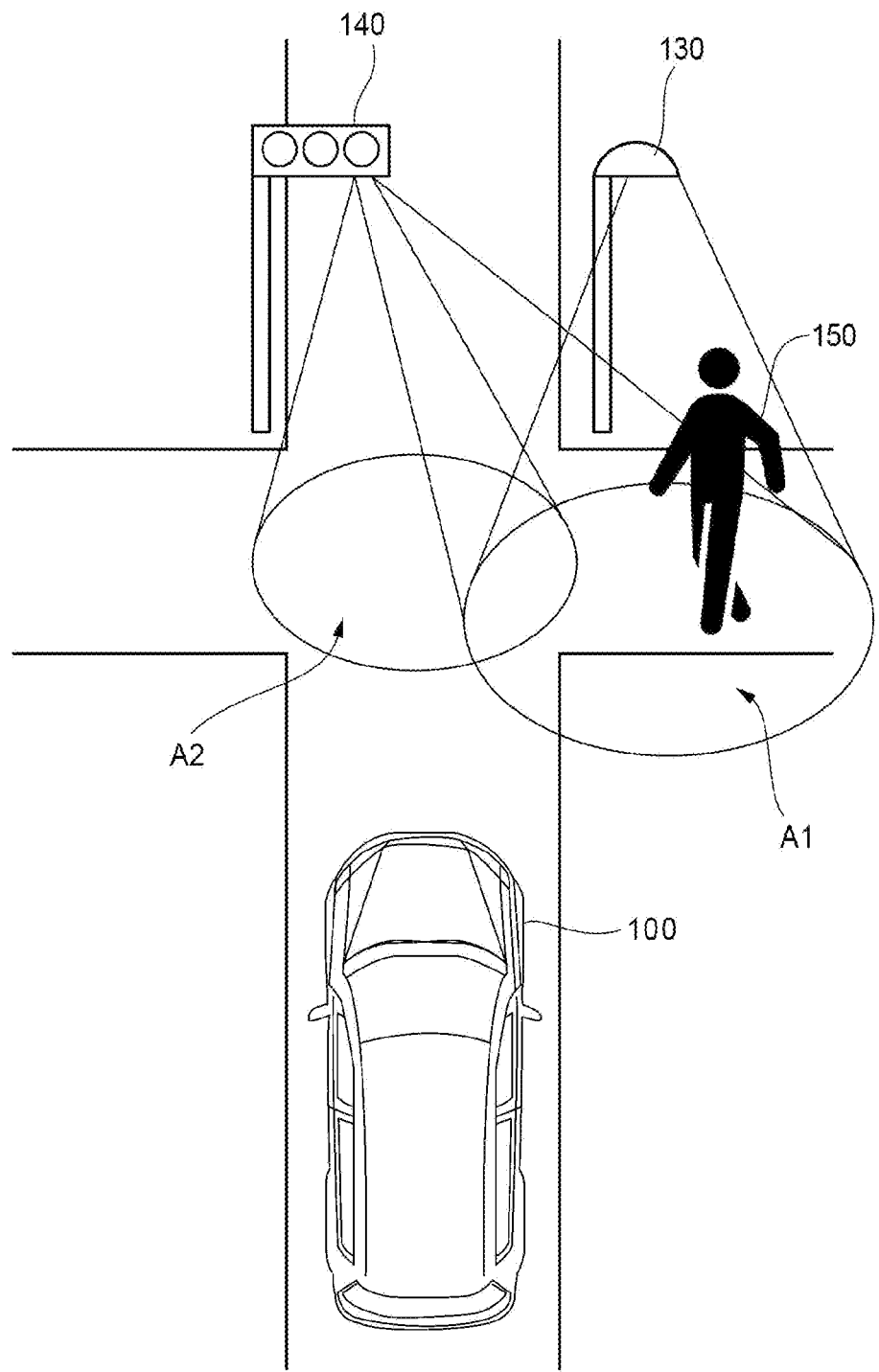
FIG. 5 illustrates an example in which the sensor system of FIG. 1 is installed in a traffic infrastructure equipment.

The sensor system 1 need not be installed in a mobile entity. As illustrated in FIG. 5, the sensor system 1 may also be installed in a traffic infrastructure equipment such as a street lamp 130 and a traffic light 140. In this case, the traffic infrastructure may be an example of the monitoring device.

In a case where the sensor system 1 is installed in the street lamp 130, a pedestrian 150 or a vehicle located in the area A1 can be detected by a plurality of sensors corresponding to the left LiDAR sensor 24 and the left camera 25 illustrated in FIG. 4. For example, in response to a detection that the pedestrian 150 or the vehicle is about to enter an intersection, the information can be notified via communication to the vehicle 100 attempting to enter the intersection from another direction.

In other words, a plurality of sensing areas corresponding to the first left sensing area LA1 and the second left sensing area LA2 illustrated in FIG. 4 are defined in the area A1. An abnormality of a cover forming a part of an outer face of the street lamp 130 can be detected based on the inconsistency between the detecting information outputted for the sensing areas.

In a case where the sensor system 1 is installed in the traffic light 140, a pedestrian 150 or a vehicle located in the area A1 can be detected by a plurality of sensors corresponding to the right LiDAR sensor 34 and the right camera 35 illustrated in FIG. 4. For example, in response to a detection that the pedestrian 150 or the vehicle is about to enter an intersection, information (characters, markers, blinking alert colors, etc.) prompting the vehicle 100 attempting to enter the intersection from another direction may be drawn in the area A2 by another light source that emits visible light.

In other words, a plurality of sensing areas corresponding to the first right sensing area RA1 and the second right sensing area RA2 illustrated in FIG. 4 are defined in the area A1. An abnormality of a cover forming a part of an outer face of the traffic light 140 can be detected based on the inconsistency between the detecting information outputted for the sensing areas.

In addition, based on the inconsistency between the detecting information obtained from the sensing area associated with the street lamp 130 and the detecting information obtained from the sensing area associated with the traffic light 140, an abnormality of the cover forming a part of the outer face of the street lamp 130 or the cover forming a part of the outer face of the traffic light 140 can be detected.

The present application is based on Japanese Patent Application No. 2020-031850 filed on Feb. 27, 2020, the entire contents of which are incorporated herein by reference.

The invention claimed is:

1. A sensor system adapted to be installed in a monitoring device, comprising:
    a first sensor configured to detect, with first light, a state of a first area that is located outside the monitoring device, and to output first detecting information corresponding to the state of the first area;
    a second sensor configured to detect, with second light, a state of a second area that is located outside the monitoring device and at least partially overlaps with the first area, and to output second detecting information corresponding to the state of the second area;
    a cover covering at least one of the first sensor and the second sensor while forming a part of an outer face of the monitoring device, and configured to allow passage of at least one of the first light and the second light; and
    a control device configured to detect an abnormality of the cover based on an inconsistency between the first detecting information and the second detecting information that are outputted for an area where the first area and the second area are overlapping with each other,
    wherein the first sensor and the second sensor are disposed in a chamber at least a part of which is defined by the cover.

2. The sensor system according to claim 1, further comprising:
    a third sensor configured to detect, with third light, a state of a third area that is located outside the monitoring device and at least partially overlaps with the first area and the second area, and to output third detecting information corresponding to the state of the third area,
    wherein the third sensor is disposed outside the chamber; and
    wherein the control device is configured to detect an abnormality of the cover based on an inconsistency between the first detecting information and the second detecting information that are outputted for an area where the first area, the second area, and the third area are overlapping with each other.

3. The sensor system according to claim 1,
    wherein the control device is configured to perform determination for the inconsistency in a case where a relative speed between the cover and a detected object located in the area where the first area and the second area are overlapping with each other is no greater than a threshold value.

4. The sensor system according to claim 3,
    wherein the detected object is a traffic sign.

5. The sensor system according to claim 1,
    wherein the monitoring device is a mobile entity.

6. A control device adapted to be installed in a monitoring device, comprising:
    a reception interface configured to:
        receive first detecting information corresponding to a state of a first area that is located outside the monitoring device from a first sensor that is configured to detect the state of the first area with first light; and
        receive second detecting information corresponding to a state of a second area that is located outside the monitoring device and at least partially overlaps with the first area from a second sensor that is configured to detect the state of the second area with second light; and
    a processor configured to detect an abnormality of a cover that covers at least one of the first sensor and the second sensor while forming a part of an outer face of the monitoring device and allows passage of at least one of the first light and the second light, based on an inconsistency between the first detecting information and the second detecting information that are outputted for an area where the first area and the second area are overlapping with each other, wherein the first sensor and the second sensor are disposed in a chamber at least a part of which is defined by the cover.

7. A non-transitory computer-readable medium having stored a computer program adapted to be executed by a processor installed in a control device adapted to be installed in a monitoring device, the computer program being configured to cause, when executed, the control device to:
receive first detecting information corresponding to a state of a first area that is located outside the monitoring device from a first sensor that is configured to detect the state of the first area with first light;
receive second detecting information corresponding to a state of a second area that is located outside the monitoring device and at least partially overlaps with the first area from a second sensor that is configured to detect the state of the second area with second light; and
detect an abnormality of a cover that covers at least one of the first sensor and the second sensor while forming a part of an outer face of the monitoring device and allows passage of at least one of the first light and the second light, based on an inconsistency between the first detecting information and the second detecting information that are outputted for an area where the first area and the second area are overlapping with each other,
wherein the first sensor and the second sensor are disposed in a chamber at least a part of which is defined by the cover.

* * * * *